US012656870B2

(12) United States Patent
Zhou et al.

(10) Patent No.: US 12,656,870 B2
(45) Date of Patent: Jun. 16, 2026

(54) MOBILE TERMINAL

(71) Applicant: AAC Microtech (Changzhou) Co., Ltd., Changzhou (CN)

(72) Inventors: Zhuofan Zhou, Changzhou (CN); Wenbiao Xu, Changzhou (CN); Xia Zheng, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 253 days.

(21) Appl. No.: 18/679,378

(22) Filed: May 30, 2024

(65) Prior Publication Data

US 2025/0190054 A1 Jun. 12, 2025

Related U.S. Application Data

(63) Continuation of application No. PCT/CN2023/136744, filed on Dec. 6, 2023.

(51) Int. Cl.
*G06F 3/01* (2006.01)
*H02N 2/04* (2006.01)
(52) U.S. Cl.
CPC .............. *G06F 3/016* (2013.01); *H02N 2/04* (2013.01)
(58) Field of Classification Search
CPC ................................. G06F 3/016; H02N 2/04
See application file for complete search history.

(56) References Cited

U.S. PATENT DOCUMENTS

| | | | | |
|---|---|---|---|---|
| 4,736,131 | A * | 4/1988 | Fujimoto | H02N 2/023 |
| | | | | 310/328 |
| 9,104,271 | B1 * | 8/2015 | Adams | G06F 3/0233 |
| 11,422,630 | B2 * | 8/2022 | Chen | B06B 1/0648 |
| 11,789,557 | B2 * | 10/2023 | Zhang | G06F 3/016 |
| | | | | 345/173 |
| 11,790,811 | B2 * | 10/2023 | Chen | G02F 1/133394 |
| | | | | 361/679.01 |
| 11,850,630 | B2 * | 12/2023 | Neuwirth | H10N 30/50 |
| 12,524,085 | B1 * | 1/2026 | Mohammad | G06F 3/03543 |
| 2021/0031235 | A1 * | 2/2021 | Neuwirth | H03K 17/964 |
| 2022/0057863 | A1 * | 2/2022 | Chen | B06B 1/0648 |
| 2022/0058989 | A1 * | 2/2022 | Chen | G06F 1/1637 |
| 2022/0214790 | A1 * | 7/2022 | Zhang | G06F 3/03547 |
| 2023/0339328 | A1 * | 10/2023 | Korczak | G06F 3/016 |
| 2024/0147865 | A1 * | 5/2024 | Zhong | H10N 30/2046 |
| 2024/0244980 | A1 * | 7/2024 | Zhou | H10N 30/872 |
| 2024/0341197 | A1 * | 10/2024 | Shu | H10N 30/302 |
| 2025/0190054 | A1 * | 6/2025 | Zhou | H04M 1/03 |

* cited by examiner

*Primary Examiner* — Patrick F Marinelli
(74) *Attorney, Agent, or Firm* — Wiersch Law Group

(57) ABSTRACT

A mobile terminal, including: middle frame, main screen and secondary screen arranged at the middle frame. The secondary screen is arranged, in folded state, at back side of the main screen or at side of the main screen. The mobile terminal further includes at least one piezoelectric actuator fixed in the middle frame. The middle frame includes bottom wall and side wall bent and extending from the bottom wall to form receiving space. The piezoelectric actuator has one side fixed to the bottom wall, and another side fixed to the secondary screen. The piezoelectric actuator converts transverse deformation of the piezoelectric actuator into longitudinal driving force to drive the secondary screen to vibrate and sound and provide tactile feedback for the secondary screen. The piezoelectric actuator can improve overall firmness of the mobile terminal, and facilitating waterproof and dustproof effects, thereby enriching use experience.

8 Claims, 5 Drawing Sheets

100

120

A

120

A

110

MOBILE TERMINAL

TECHNICAL FIELD

The present disclosure relates to the field of acoustic and electrical conversion, and in particular, to a mobile terminal.

BACKGROUND

Modern smart phones are often provided with another screen (secondary screen) on the back for facilitating display of information and operations, especially reflected in the development of foldable screen phones. The foldable screen phone are often provided with a second screen (external screen) for facilitating users to access information and operate the interface without having to unfold to expose the main screen. However, the second screen on the modern smart phones only has the display functions and cannot provide the tactile feedback and the screen sound production, resulting in poor user experiences.

In view of the above problems, it is necessary to provide a mobile terminal with proper design to effectively solve the above problems.

SUMMARY

Embodiments of the present disclosure provide a mobile terminal to solve at least one of the technical problems existing in the related art.

Embodiments of the present disclosure provides a mobile terminal, which includes: a middle frame comprising a bottom wall and a side wall bent and extending from the bottom wall to form a receiving space with the bottom wall, a main screen arranged on the middle frame, a secondary screen arranged on the middle frame, the secondary screen is arranged, in a folded state, at a back side of the main screen or arranged at a side of the main screen in parallel, and at least one piezoelectric actuator fixed in the middle frame. A side of the piezoelectric actuator is fixed and connected to the bottom wall, and another side of the piezoelectric actuator is fixed and connected to the secondary screen; the piezoelectric actuator is configured to convert transverse deformation of the piezoelectric actuator into a longitudinal driving force to drive the secondary screen to vibrate and sound and provide tactile feedback for the secondary screen.

As an improvement, the piezoelectric actuator is configured to detect pressing force information of the secondary screen.

As an improvement, the at least one piezoelectric actuator comprises only one piezoelectric actuator arranged at a central region of the secondary screen, and a center of gravity of the one piezoelectric actuator is arranged at a center line of the secondary screen. Alternatively, the at least one piezoelectric actuator comprises a plurality of piezoelectric actuators arranged at an edge region of the secondary screen and arranged symmetrically with respect to center line of the secondary screen.

As an improvement, the piezoelectric actuator comprises a piezoelectric body and two sets of elastic brackets arranged at two ends of the piezoelectric body in a telescopic direction of the piezoelectric body. Each set of elastic brackets comprises a first elastic sheet and a second elastic sheet spaced from each other along a thickness direction of the piezoelectric body. A first end of the first elastic sheet is fixed to a first surface of the piezoelectric body, and a second end of the first elastic sheet is fixed and connected to the secondary screen. A first end of the second elastic sheet is fixed to a second surface of the piezoelectric body, and a second end of the second elastic sheet is fixed and connected to the middle frame.

As an improvement, the mobile terminal further includes a first support plate and a second support plate. The first support plate is arranged between the piezoelectric actuator and the secondary screen, and the second support plate is arranged between the piezoelectric actuator and the middle frame.

As an improvement, the piezoelectric actuator comprises a piezoelectric body, and a first amplifying unit and a second amplifying unit supported and fixed at two sides of the piezoelectric body along a thickness of the piezoelectric body. Two ends of the first amplifying unit are fixed to a first surface of the piezoelectric body, and a middle portion of the first amplifying unit extends in a direction away from the first surface and is connected to the secondary screen. Two ends of the second amplifying unit are fixed to a second surface of the piezoelectric body, and a middle portion of the second amplifying unit extends in a direction away from the second surface and is connected to the middle frame.

As an improvement, the first amplifying unit comprises a first elastic portion and a first connection portion extending horizontally from the first elastic portion, a side of the first elastic portion adjacent to the first surface is fixed and connected to the first surface, and a side of the first elastic portion away from the first surface is fixed and connected to the secondary screen. The second amplifying unit comprises a second elastic portion and a second connection portion extending horizontally from the second elastic portion, a side of the second elastic portion adjacent to the second surface is fixed and connected to the second surface, and a side of the second elastic portion away from the second surface is fixed and connected to the middle frame.

As an improvement, the mobile terminal further includes a flexible connection member, and the secondary screen is flexible and connected to the middle frame through the flexible connection member.

As an improvement, a side of the flexible connection member facing an interior of the middle frame is recessed to form a first recessed portion, and a size of the first recessed portion gradually decreases in a direction away from the receiving space. Additionally or alternatively, a side of the flexible connection member facing the secondary screen is recessed to form a second recessed portion, and a size of the second recessed portion gradually decreases in a direction away from the secondary screen.

According to the mobile terminal provided by embodiments of the present disclosure, the mobile terminal includes at least one piezoelectric actuator fixed in the middle frame. A side of the piezoelectric actuator is fixed and connected to the bottom wall of the middle frame, and another side of the piezoelectric actuator is fixed and connected to the secondary screen. The piezoelectric actuator converts the transverse deformation of the piezoelectric actuator into a longitudinal driving force to drive the secondary screen to vibrate and sound, so that the piezoelectric actuator can be used as a supplement of a receiver or a loudspeaker. The vibration and sound of the secondary screen does not require any opening, thereby improving the overall firmness of the mobile terminal, and facilitating waterproof and dustproof effects. When the mobile terminal is as a foldable screen phone, a call can be received without unfolding the screen, thereby enhancing the user experience. The secondary screen is driven by the piezoelectric actuator to vibrate in a proper frequency range, so that the secondary screen generates tactile feedback to a palm or a finger in contact, thereby enriching and enhancing the use experience of the mobile terminal.

DESCRIPTION OF EMBODIMENTS

To enable those skilled in the art to better understand the technical solution according to an embodiment of the present disclosure, the present disclosure is further described in detail below with reference to the accompanying drawings and detailed description.

Figure 1:
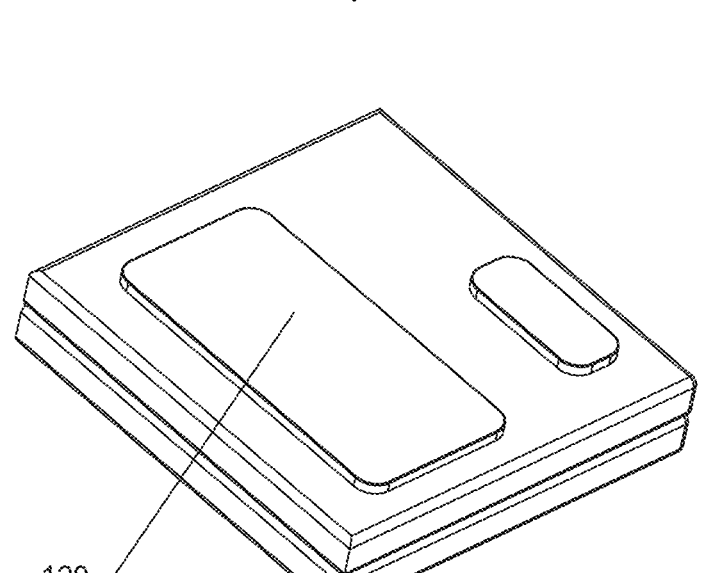
FIG. 1 is a schematic assembly diagram of a mobile terminal according to an embodiment of the present disclosure.
Figure 2:
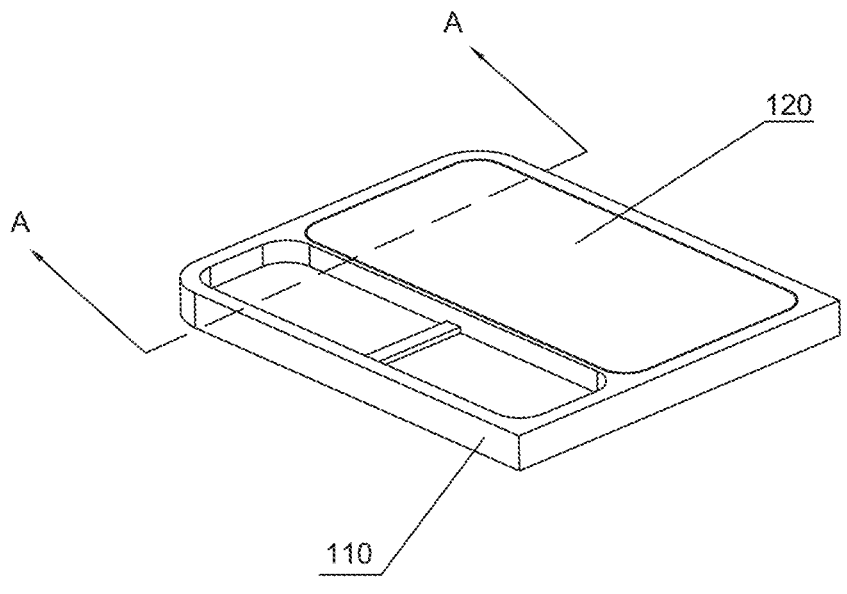
FIG. 2 is a schematic assembly diagram of a middle frame, a secondary screen and a piezoelectric actuator according to an embodiment of the present disclosure.
Figure 3:
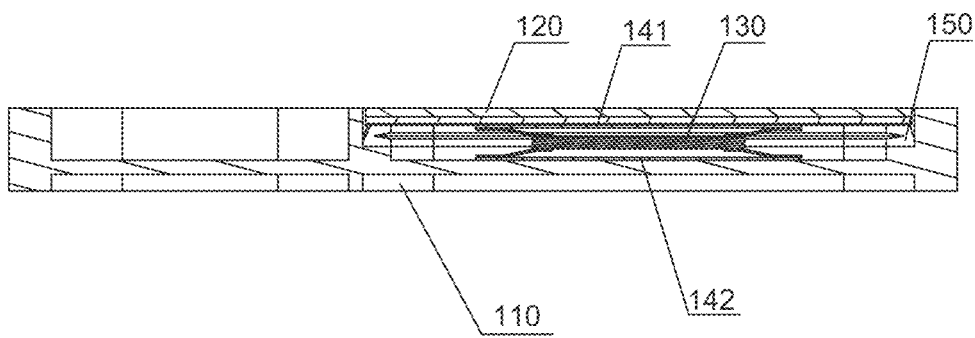
FIG. 3 is a cross-sectional view taken along A-A direction of the mobile terminal in FIG. 2, including a middle frame, a secondary screen, and a piezoelectric actuator.

As shown in FIG. 1 to FIG. 3, an embodiment of the present disclosure provides a mobile terminal 100, including a middle frame 110, a main screen and a secondary screen 120 arranged at the middle frame 110. The secondary screen 120 is folded and arranged at a back side of the main screen or arranged at a side of the main screen in parallel in different folded states. The mobile terminal 100 further includes at least one piezoelectric actuator 130 fixed in the middle frame 110, and the middle frame 110 includes a bottom wall 111 and a side wall 112 bent and extending from the bottom wall 111 to form a receiving space with the bottom wall 111. A side of the piezoelectric actuator 130 is fixed and connected to the bottom wall 111, and another side of the piezoelectric actuator 130 is fixed and connected to the secondary screen 120. The piezoelectric actuator 130 converts transverse deformation thereof into longitudinal driving force to drive the secondary screen 120 to vibrate and sound and provide tactile feedback for the secondary screen 120.

It should be noted that the mobile terminal 100 may be a smart bar phone, or a foldable screen phone. If the mobile terminal 100 is a smart bar phone, the secondary screen 120 is arranged at a back side of the smart bar phone. If the mobile terminal 100 is the foldable screen phone, the secondary screen 120 is arranged at a back side of the foldable screen phone.

According to the mobile terminal provided by an embodiment of the present disclosure, the mobile terminal includes at least one piezoelectric actuator fixed in the middle frame. A side of the piezoelectric actuator is fixed and connected to the bottom wall of the middle frame, and another side of the piezoelectric actuator is fixed and connected to the secondary screen. The piezoelectric actuator converts the transverse deformation of the piezoelectric actuator into longitudinal driving force to drive the secondary screen to vibrate and sound, so that the piezoelectric actuator can be used as a supplement of a receiver or a loudspeaker. The vibration and sound of the secondary screen does not require openings, thereby improving the overall firmness of the mobile terminal, and facilitating waterproof and dustproof effects. When the mobile terminal is a mobile phone with a foldable screen, a call can be received without opening the foldable screen, thereby enhancing the user experience. The secondary screen is driven by the piezoelectric actuator to vibrate in a proper frequency range, so that the secondary screen generates tactile feedback to the palm or finger in contact, thereby enriching and enhancing the use experience on the mobile terminal.

In an embodiment, the piezoelectric actuator 130 is configured to detect pressing force information of the secondary screen 120.

According to the mobile terminal provided by an embodiment of the present disclosure, the piezoelectric actuator can detect the pressing force information of the secondary screen, and has the function of pressure sensing. When the secondary screen is subjected to external pressure, it can engage in self-protection to prevent excessive vibration that may damage the secondary screen, and the piezoelectric actuator can serves as a pressure button to replace certain functions such as power keys or volume controls.

For example, as shown in FIG. 3, there may be one piezoelectric actuator 130, and the one piezoelectric actuator 130 is arranged at a central region of the secondary screen 120 and has a center of gravity located at a center line of the secondary screen 120.

Figure 8:
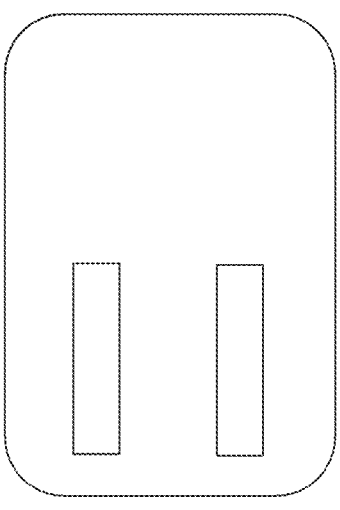
FIG. 8 is a distribution diagram of a piezoelectric actuator on a secondary screen according to a second embodiment of the present disclosure.
Figure 9:
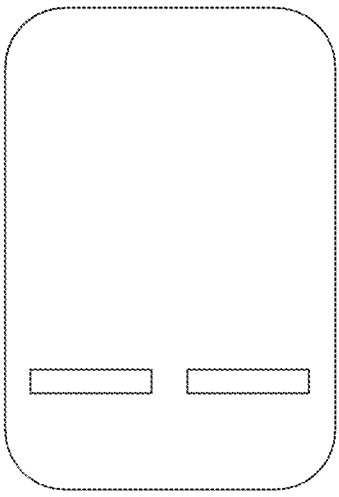
FIG. 9 is a distribution diagram of a piezoelectric actuator on a secondary screen according to a second embodiment of the present disclosure.

As shown in FIG. 8 and FIG. 9, there may be a plurality of piezoelectric actuators 130, and the plurality of piezoelectric actuators 130 are arranged at an edge region of the secondary screen 120 and arranged symmetrically with respect to the center line of the secondary screen 120. In this embodiment, two piezoelectric actuators 130 will be described as an example.

Figure 4:
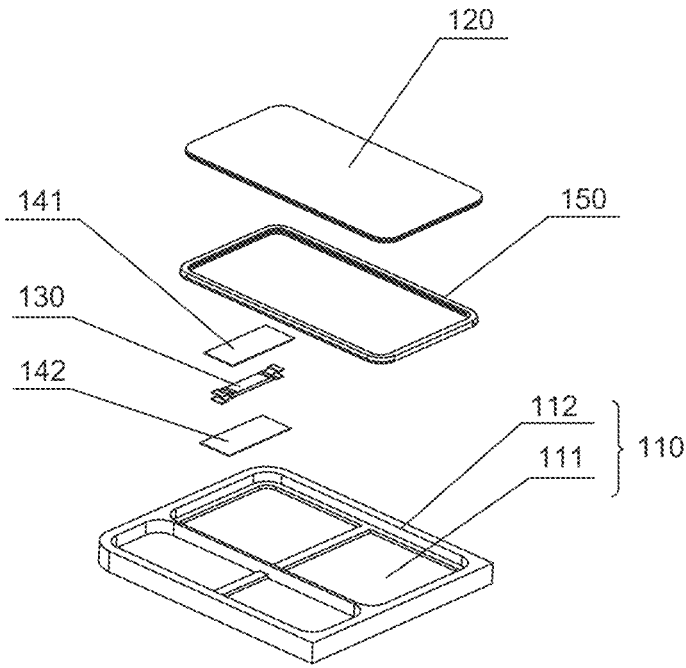
FIG. 4 is a perspective exploded view of a middle frame, a secondary screen and a piezoelectric actuator according to an embodiment of the present disclosure.
Figure 5:
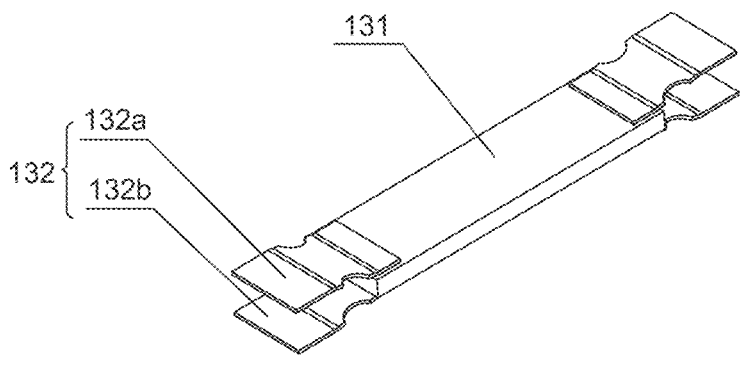
FIG. 5 is a schematic structural diagram of a piezoelectric actuator according to a first embodiment of the present disclosure.

In a first embodiment, the piezoelectric actuator 130 may adopt a separate inverted arch support structure as shown in FIGS. 3-5, which is arranged at a central region of the secondary screen 120 and with its center of gravity arranged at the center line of the secondary screen 120.

For example, the piezoelectric actuator 130 includes a piezoelectric body 131 and two sets of elastic brackets 132 arranged at ends of the piezoelectric body 131 in a telescopic direction thereof. The elastic brackets 132 are symmetrically arranged. In this embodiment, the piezoelectric body 131 may be a piezoelectric ceramic layer for detecting a touch pressure signal of the secondary screen.

As shown in FIG. 5, each set of elastic brackets 132 includes a first elastic sheet 132*a* and a second elastic sheet 132*b* spaced from each other along a thickness direction of the piezoelectric body 131. A first end of the first elastic sheet 132a is fixed to a first surface of the piezoelectric body 131, and a second end of the first elastic sheet 132a is fixed and connected to the secondary screen 120. The second end of the first elastic sheet 132a extends along the telescopic direction of the piezoelectric body 131. In other words, the second end of the first elastic sheet 132a extends in the horizontal direction, as shown in FIG. 5.

The first end of the second elastic sheet 132b is fixed to the second surface of the piezoelectric body 131, and the second end of the second elastic sheet 132b is fixed and connected to the middle frame 110. The second end of the second elastic sheet 132b extends along the telescopic direction of the piezoelectric body 131. In other words, the second end of the second elastic sheet 132b extends in the horizontal direction, as shown in FIG. 5.

In addition, as shown in FIG. 3 and FIG. 5, the first elastic sheet 132a and the second elastic sheet 132b both form an opening angle with a plane where the piezoelectric body 131 is arranged, and the opening angle is less than 45°.

In this embodiment, the piezoelectric actuator 130 adopts a d31 vibration mode. The transverse telescopic motion of the piezoelectric body 131 is converted into vertical longitudinal vibration through the elastic brackets 132 at two ends. On the premise that the elastic brackets 132 are symmetrical, the piezoelectric body 131 pushes the secondary screen 120 to integrally move along the thickness direction of the secondary screen 120, thereby producing sound by moving the air.

In a sound producing state of the secondary screen 120, the elastic brackets 132 at both ends of the piezoelectric body 131 can reduce the inherent frequency of the piezoelectric body 131 (a piezoelectric ceramic layer), thereby improving the frequency response performance, and enhancing a sound pressure level of medium bass. In addition, a high-order vibration mode can be suppressed through the vibration transmission effect of the elastic brackets 132, thereby improving the distortion degree of screen sound production and improving the sound reproduction degree.

In a tactile feedback state, the elastic brackets 132 can reduce the resonance frequency, support the suspension of the piezoelectric body 131 (the piezoelectric ceramic layer), and conduct a longitudinal pressure to a transverse force of the piezoelectric body 131, so that the piezoelectric body 131 can have a pressure detection function.

As shown in FIG. 3 to FIG. 5, in the first embodiment, when the piezoelectric actuator 130 adopts the inverted arch support structure as shown in FIG. 5, the mobile terminal 100 further includes a first support plate 141 and a second support plate 142. The first support plate 141 is arranged between the piezoelectric actuator 130 and the secondary screen 120, and the second support plate 142 is arranged between the piezoelectric actuator 130 and the middle frame 110. The first support plate 141 and the second support plate 142 support the piezoelectric actuator 130.

Figure 6:
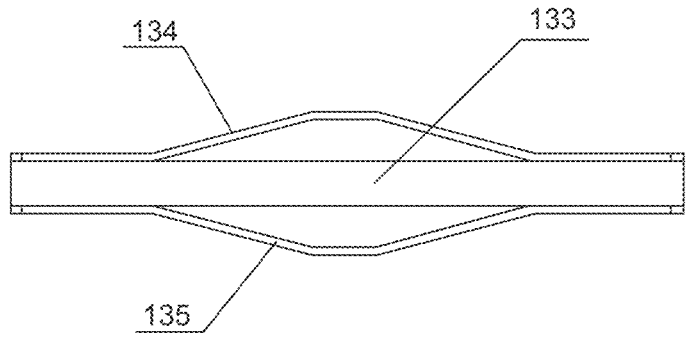
FIG. 6 is a schematic structural diagram of a piezoelectric actuator according to a second embodiment of the present disclosure.
Figure 7:
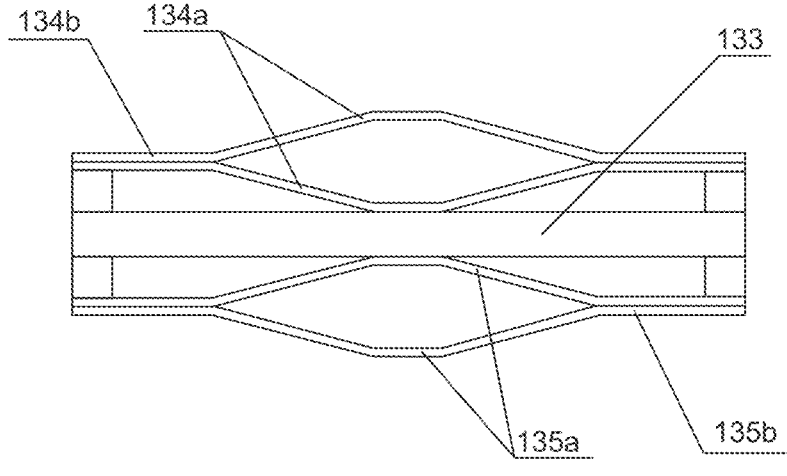
FIG. 7 is a schematic structural diagram of another piezoelectric actuator according to a second embodiment of the present disclosure.

For example, as shown in FIG. 6 and FIG. 7, in s second embodiment, the piezoelectric actuator 130 includes a piezoelectric body 133, and a first amplifying unit 134 and a second amplifying unit 135 that are supported and fixed to two sides of the piezoelectric body 133 along a thickness thereof.

Each of two ends of the first amplifying unit 134 is fixed to a first surface of the piezoelectric body 133, and a middle portion of the first amplifying unit 134 extends in a direction away from the first surface of the piezoelectric body 133 and is connected to the secondary screen 120. Each of two ends of the second amplifying unit 135 is fixed to a second surface of the piezoelectric body 133, and a middle portion of the second amplifying unit 135 extends in a direction away from the second surface of the piezoelectric body 133 and is connected to the middle frame 110. In other words, as shown in FIG. 6, the first amplifying unit 134 and the second amplifying unit 135 are symmetrically arranged about the piezoelectric body 133.

In an example, when subjected to an external voltage, the piezoelectric body 133 stretches and retracts along a first direction parallel to a plane where the piezoelectric body 133 is arranged. Meanwhile, the first amplifying unit 134 and the second amplifying unit 135 stretch and retract along a second direction, and the first direction is perpendicular to the second direction. The first amplifying unit 134 and the second amplifying unit 135 are stretched and retracted in the second direction, which can drive the secondary screen 120 to vibrate in the thickness direction thereof. The piezoelectric body 133 may be the piezoelectric ceramic layer for detecting a touch pressure signal of the secondary screen.

As shown in FIG. 8 and FIG. 9, in the second embodiment, there are two piezoelectric actuators 130, and the two piezoelectric actuators 130 are arranged at the edge region of the secondary screen 120 and arranged symmetrically with respect the center line of the secondary screen 120.

As shown in FIG. 8, length directions of the two piezoelectric actuators 130 may be symmetrically arranged with a length direction of the secondary screen 120. As shown in FIG. 9, the length directions of the two piezoelectric actuators 130 may be symmetrically arranged with a width direction of the secondary screen 120. In this embodiment, the distribution manner of the two piezoelectric actuators 130 is not specifically limited herein, and may be selected according to practical requirements as long as they are symmetrically arranged about the center line of the secondary screen 120.

In this embodiment, the piezoelectric actuator 130 may adopt two rhombic amplification mechanism piezoelectric actuators as shown in FIG. 6. The two rhombic amplification mechanism piezoelectric actuators are arranged in a paired symmetrical distribution, and driven by signals of the same frequency and phase, so that the secondary screen 120 generates the same displacement on two supporting points, thereby causing the secondary screen 120 to perform a piston movement integrally in the thickness direction thereof. The two rhombic amplification mechanisms piezoelectric actuators can further realize integration of various functions, or independently realize functions such as screen sounding, pressure sensing and vibration feedback.

Further, as shown in FIG. 7, in a third embodiment, the first amplifying unit 134 includes a first elastic portion 134a and a first connection portion 134b extending horizontally from the first elastic portion 134a. A side of the first elastic portion 134a adjacent to a first surface of the piezoelectric body 133 is fixed and connected to the first surface of the piezoelectric body 133, and a side of the first elastic portion 134a away from the first surface is fixed and connected to the secondary screen 120.

The second amplifying unit 135 includes a second elastic portion 135a and a second connection portion 135b extending horizontally from the second elastic portion 135a. A side of the second elastic portion 135a adjacent to a second surface of the piezoelectric body 133 is fixed and connected to the second surface of the piezoelectric body 133, and a side of the second elastic portion 135a away from the second surface of the piezoelectric body 133 is fixed and connected to the middle frame 120.

In other words, the first elastic portion 134a and the second elastic portion 135a are both formed as a rhombus shape and symmetrically arranged around the piezoelectric body 133. The first connection portion 134*b* and the second connection portion 135*b* are symmetrically arranged about the piezoelectric body 133.

Further, in the third embodiment, the piezoelectric actuator 130 may adopt two double-layer amplification mechanism piezoelectric actuators as shown in FIG. 7, and the two double-layer amplification mechanism piezoelectric actuators are further symmetrically arranged in pair. The piezoelectric actuator can alleviate some problems of the piezoelectric body caused by such as small response displacement or large applied voltage, thereby making the piezoelectric vibrator small in size, fast in response, adjustable in resonance frequency, wide in operating frequency, and high in energy conversion efficiency.

Due to the small screen size and high equivalent stiffness, the existing foldable screen phone produces excessively high low frequencies and exhibits poor performance in the low frequencies and intermediate frequencies when sound is produced by bending the screen. The two rhombic amplification mechanism piezoelectric actuators of the mobile terminal 100 in this embodiment of the present disclosure further improve the low frequencies performance and increase the vibration displacement.

Figure 10:
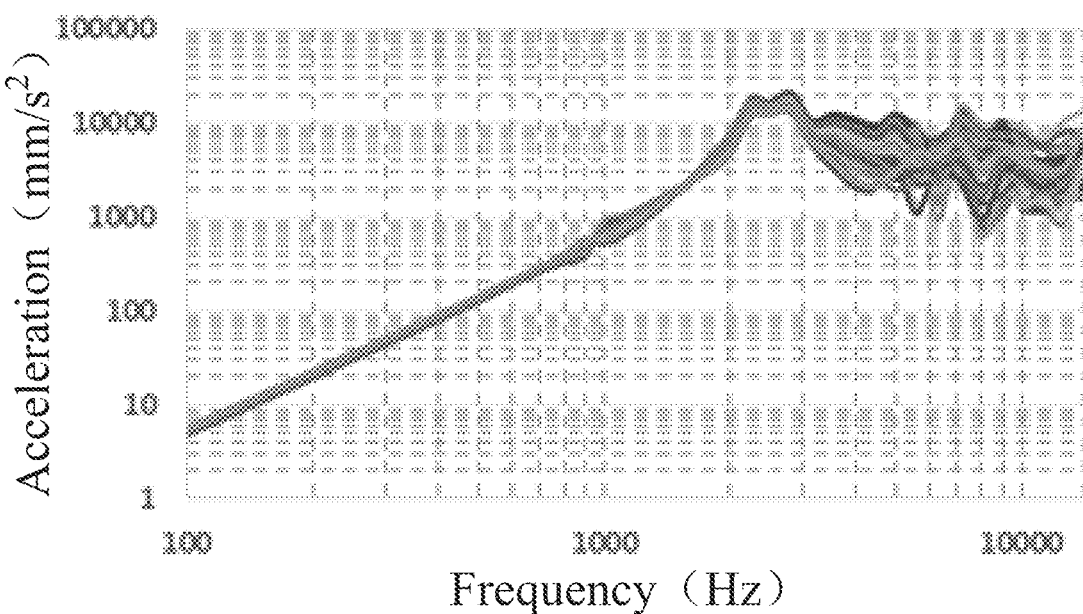
FIG. 10 is an acceleration-frequency response graph of the vibration of a secondary screen according to an embodiment of the present disclosure.

As shown in FIG. 10, when the vibration acceleration and frequency test is conducted on the secondary screen 120, the secondary screen 120 has the excellent vibration frequency performance.

For example, as shown in FIG. 3 and FIG. 4, the mobile terminal 100 further includes a flexible connection member 150, and the secondary screen 120 is flexibly connected to the middle frame 110 through the flexible connection member 150.

In an embodiment of the present disclosure, the secondary screen is flexibly connected to the middle frame through the flexible connection member. On one hand, the connection stiffness of the middle frame and the secondary screen is reduced, and the flexible connection member maintains the sealing performance between the middle frame and the secondary screen. On the other hand, the flexible connection member provides a motion space for vibration of the secondary screen.

For example, the flexible connection member 150 covers at least part of the secondary screen 120. As shown in FIG. 4, in this embodiment, the flexible connection member 150 is formed as a sealing ring covering a part of the secondary screen 120. It is understandable that, the flexible connection member 150 may cover all the secondary screen 120, and the extent to which the flexible connection member 150 covers the secondary screens 120 may be selected according to actual requirements.

It should be noted that the flexible connection member 150 may be made of buffer materials such as rubber, foam, resin, latex, and may be selected according to actual requirements.

It should be further noted that the flexible connection between the secondary screen 120 and the middle frame 110 may further be in other manners, such as a spring and a flexible cloth seal, which are more conducive to adjusting the connection stiffness thereof, thereby enabling the adjustment of the sound production or vibration frequency of the secondary screen 120.

Figure 11:
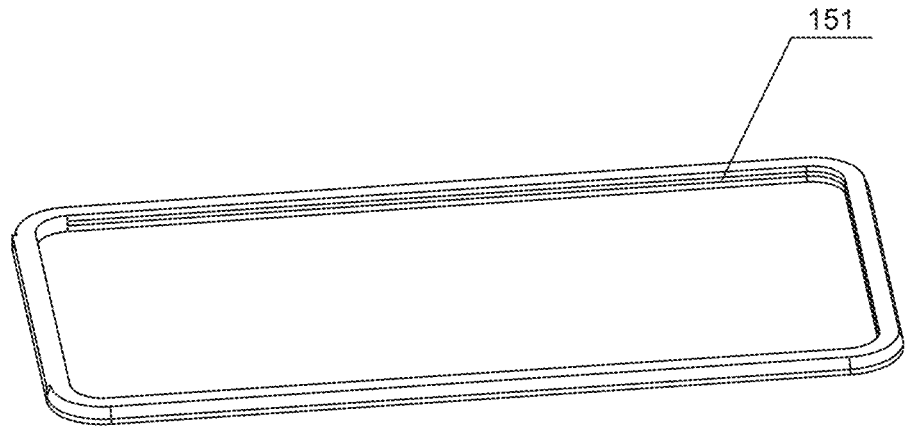
FIG. 11 is a schematic structural diagram of a first recessed portion in a flexible connection member according to an embodiment of the present disclosure.

For example, as shown in FIG. 11, a side of the flexible connection member 150 facing an interior of the middle frame 110 is recessed to form a first recessed portion 151, and a size of the first recessed portion 151 gradually decreases in a direction away from the receiving space of the middle frame 110. Additionally or alternatively, a side of the flexible connection member 150 facing the secondary screen 120 is recessed to form a second recessed portion, and a size of the second recessed portion gradually decreases in a direction away from the secondary screen.

In this embodiment, as shown in FIG. 11, the first recessed portion 151 and the second recessed portion have the same structure and may both be stepped in shape. The flexible connection member 150 may form the first recessed portion 151 only at a side facing the interior of the middle frame 110, or may form the second recessed portion only at a side facing the secondary screen 120. It is understandable that, the flexible connection member 150 may have both the first recessed portion 151 and the second recessed portion, which may be selected according to actual requirements, and be not limited herein by the embodiments of the present disclosure.

In this embodiment, by forming the first recessed portion and/or the second recessed portion at the flexible connection member, the middle frame and the secondary screen may be better accommodated, thereby providing better sealing for the middle frame and the secondary screen.

The mobile terminal in the embodiments of the present disclosure may be applied to the following scenarios:

1) Secondary screen pressure sensing and secondary screen sound production: due to the overall vibration requirement of the secondary screen, the display effect of the secondary screen will be affected during the content display, and the content display of the secondary screen needs to be turned off during calls. By detecting the pressure sensing, the state of the secondary screen or the mobile terminal can be determined to prevent damage to the screen due to excessive force, further protecting the secondary screen. Meanwhile, whether fingers is pressing or the device approaching the body can be determined so as to trigger corresponding operations.

2) Pressure buttons and vibration feedback in gaming scenarios: The secondary screen can be designed as an additional touch button to provide more operational experiences. For example, when touched by a finger or a palm, the tactile feedback functionality may be provided. When gaming, the screen can serve as a pressure button, thus providing more display space and different intensity operational experiences for the main screen.

It can be understood that the above implementations are merely exemplary implementations used for illustrating the principles of the embodiments of the present disclosure, but the embodiments of the present disclosure are not limited thereto. For those skilled in the art, various modifications and improvements may be made without departing from the spirit and essence of the embodiments of the present disclosure, and these modifications and improvements are further considered as the protection scope of the embodiments of the present disclosure.

What is claimed is:

1. A mobile terminal, comprising:

a middle frame comprising a bottom wall and a side wall bent and extending from the bottom wall to form a receiving space with the bottom wall, a main screen arranged on the middle frame, a secondary screen arranged on the middle frame, wherein the secondary screen is arranged, in a folded state, at a back side of the main screen or arranged at a side of the main screen in parallel, and at least one piezoelectric actuator fixed in the middle frame, wherein a side of the piezoelectric actuator is fixed and connected to the bottom wall, and another side of the piezoelectric actuator is fixed and connected to the secondary screen; the piezoelectric actuator is configured to convert transverse deformation of the piezoelectric actuator into a longitudinal driving force to drive the secondary screen to vibrate and sound and provide tactile feedback for the secondary screen, wherein the piezoelectric actuator comprises a piezoelectric body and two sets of elastic brackets arranged at two ends of the piezoelectric body in a telescopic direction of the piezoelectric body;

each set of elastic brackets comprises a first elastic sheet and a second elastic sheet spaced from each other along a thickness direction of the piezoelectric body;

a first end of the first elastic sheet is fixed to a first surface of the piezoelectric body, and a second end of the first elastic sheet is fixed and connected to the secondary screen; and a first end of the second elastic sheet is fixed to a second surface of the piezoelectric body, and a second end of the second elastic sheet is fixed and connected to the middle frame.

2. The mobile terminal as described in claim 1, wherein the piezoelectric actuator is configured to detect pressing force information of the secondary screen.

3. The mobile terminal as described in claim 1, wherein the at least one piezoelectric actuator comprises only one piezoelectric actuator arranged at a central region of the secondary screen, and a center of gravity of the one piezoelectric actuator is arranged at a center line of the secondary screen; or the at least one piezoelectric actuator comprises a plurality of piezoelectric actuators arranged at an edge region of the secondary screen and arranged symmetrically with respect to the center line of the secondary screen.

4. The mobile terminal as described in claim 1, further comprising a first support plate and a second support plate, wherein the first support plate is arranged between the piezoelectric actuator and the secondary screen, and the second support plate is arranged between the piezoelectric actuator and the middle frame.

5. The mobile terminal as described in claim 1, wherein the piezoelectric actuator comprises a piezoelectric body, and a first amplifying unit and a second amplifying unit supported and fixed at two sides of the piezoelectric body along a thickness of the piezoelectric body; two ends of the first amplifying unit are fixed to a first surface of the piezoelectric body, and a middle portion of the first amplifying unit extends in a direction away from the first surface and is connected to the secondary screen; and two ends of the second amplifying unit are fixed to a second surface of the piezoelectric body, and a middle portion of the second amplifying unit extends in a direction away from the second surface and is connected to the middle frame.

6. The mobile terminal as described in claim 5, wherein the first amplifying unit comprises a first elastic portion and a first connection portion extending horizontally from the first elastic portion, a side of the first elastic portion adjacent to the first surface is fixed and connected to the first surface, and a side of the first elastic portion away from the first surface is fixed and connected to the secondary screen; and the second amplifying unit comprises a second elastic portion and a second connection portion extending horizontally from the second elastic portion, a side of the second elastic portion adjacent to the second surface is fixed and connected to the second surface, and a side of the second elastic portion away from the second surface is fixed and connected to the middle frame.

7. The mobile terminal as described in claim 1, further comprising a flexible connection member, wherein the secondary screen is flexibly connected to the middle frame through the flexible connection member.

8. The mobile terminal as described in claim 7, wherein a side of the flexible connection member facing an interior of the middle frame is recessed to form a first recessed portion, and a size of the first recessed portion gradually decreases in a direction away from the receiving space; and/or a side of the flexible connection member facing the secondary screen is recessed to form a second recessed portion, and a size of the second recessed portion gradually decreases in a direction away from the secondary screen.

* * * * *